Dec. 12, 1961 L. J. C. CONNELL 3,013,191

SEMICONDUCTOR DEVICES

Filed April 2, 1958 2 Sheets-Sheet 1

INVENTOR
Leslie James Cambridge Connell
BY Kurschbaum, Kurschbaum & Ottinger
ATTORNEYS INVENTOR
Leslie James Cambridge Connell
BY Kirschstein, Kirschstein Ottinger
ATTORNEYS United States Patent Office 3,013,191
Patented Dec. 12, 1961

3,013,191
SEMICONDUCTOR DEVICES

Leslie James Cambridge Connell, Harrow Weald, England, assignor to The General Electric Company Limited, London, England Filed Apr. 2, 1958, Ser. No. 725,938
Claims priority, application Great Britain Apr. 3, 1957
3 Claims. (Cl. 317—234)

This invention relates to semiconductor devices and is concerned particularly with semiconductor devices of the kind having a base electrode constituted by block of high thermal and electrical conductivity arranged to be cooled by cooling fluid. One such semiconductor device is described in the complete specification accompanying co-pending British patent application No. 24501/54, the base electrode in this case being hollow and arranged to be cooled internally.

The invention is especially applicable to power rectifier assemblies in which cooling fluid has to be supplied to a large number of such devices, and one object of the present invention is to provide an improved rectifier device for use in such assemblies.

According to the present invention, in a semiconductor device of the kind referred to, the base electrode is provided with means for coupling the electrode to an electrical terminal which provides an electrical connection to said electrode and forms therewith a fluid-tight chamber having inlet and outlet connections for cooling fluid.

Preferably, the base electrode is constituted by a hollow block of high thermal and electrical conductivity closed at one end and having the outer surface of the closed end secured to the semiconductor, and the closed end of the block may be shaped so that when an electric current flows through the block the current density is substantially uniform over the whole of this part of the block. The electrical terminal may comprise a tubular member having an open end, clamping means being associated with the open end of said tubular member for engaging the base electrode, and the means for ensuring circulation of cooling fluid so as to cool the electrode may comprise a further tubular member disposed within the first mentioned tubular member and having an open end spaced from the inner surface of the closed end of the block, the arrangement being such that a cooling fluid may be passed through the inner tubular member towards the closed end of the block and back through the space between the inner and outer tubular members, or vice versa.

The electrical terminal may be mounted directly upon a busbar forming therewith a unitary structure; in one construction a plurality of electrical terminals are mounted upon a common busbar.

Figure 1:
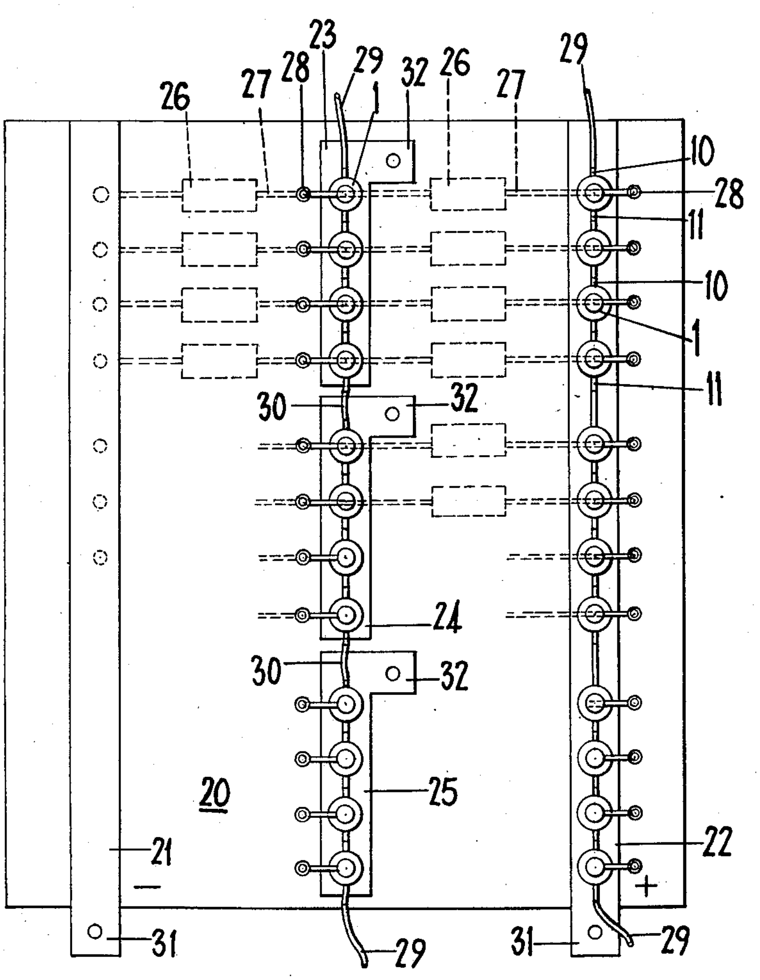
Figure 2:
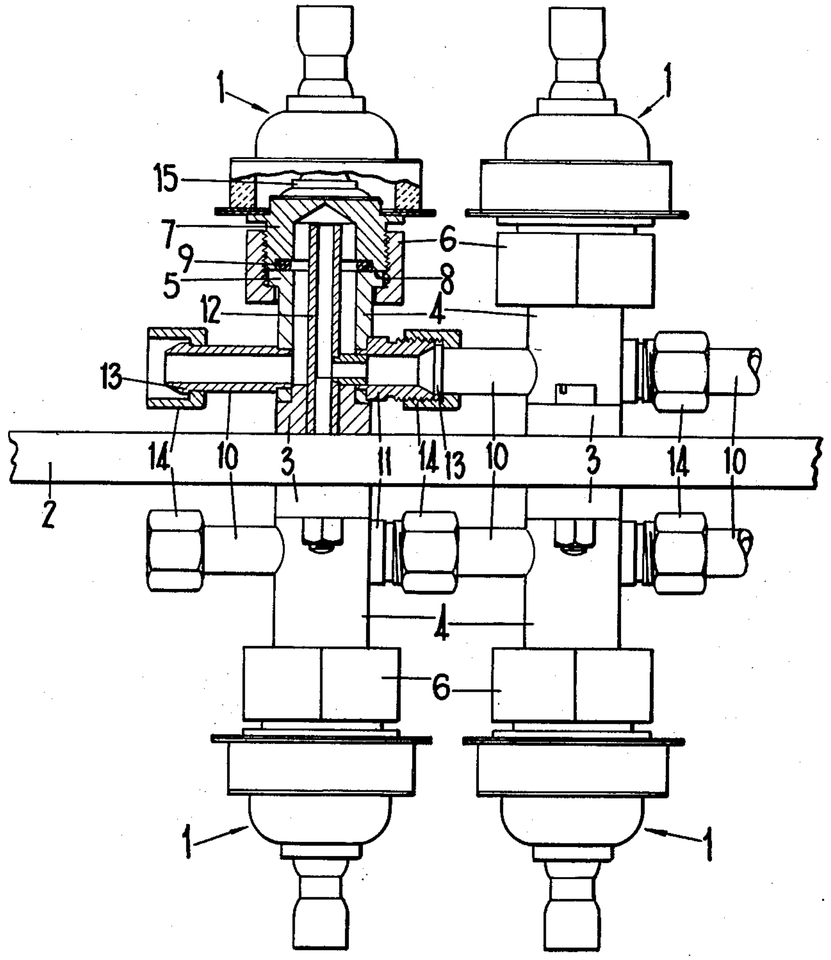

In order that the invention may be clearly understood, the invention will now be described by way of example, with reference to the accompanying drawings in which:

FIGURE 1 is a schematic diagram showing the layout of a rectifier assembly incorporating a plurality of semiconductor rectifier devices according to the present invention; and FIGURE 2 shows, partly in section, a detail of a modified rectifier assembly, this figure showing in more detail the construction of the individual rectifier devices.

Referring to FIGURE 1, a power rectifier assembly adapted for three phase operation comprises twenty four semiconductor rectifier devices 1, the actual construction of which will be described in more detail with reference to FIGURE 2, the rectifier devices being grouped to provide in each arm of a three-phase rectifier bridge four rectifier devices connected in parallel. Each rectifier device 1 comprises a germanium rectifier element and a pair of opposed electrodes, namely a base electrode and an upper electrode, providing electrical connections to the element, the base electrode being constituted by a hollow cylindrical block of copper closed at one end and having the outer surface of the closed end secured to the semiconductor, the closed end of the block being shaped so that when an electric current flows through the block the current density is substantially uniform over the whole of this part of the block. The block is arranged to be cooled on its internal surface by cooling liquid, in a manner which is described hereinafter.

The rectifier devices are mounted upon a support comprising a rectangular panel 20 of insulating material upon which are mounted two D.C. busbars 21, 22 and three A.C. busbars, 23, 24 and 25, one for each phase, the former being arranged parallel to each other upon the panel 20 and the latter being arranged in a line between the D.C. busbars and parallel thereto. Output terminals 31 are provided on the busbars 21 and 22 and input terminals 32 on the busbars 23, 24 and 25. The base electrode of each rectifier device 1 is adapted to engage with an electrical terminal mounted directly upon a busbar, the base electrode and the terminal forming a two-part coupling whereby the device is both electrically connected to, and securely mounted upon the busbar. Each terminal is adapted to provide means for supplying cooling fluid to the interior of the electrode mounted thereon. In this way the devices are mounted directly upon the busbars, there being a group of four devices mounted upon each of the A.C. busbars and a group of twelve devices upon one of the D.C. busbars. Associated with the rectifier assembly there are twenty-four fuses 26, one for each rectifier device. The upper electrode of each of the rectifier devices in each group of four is connected to one side of a fuse, the other side of which is connected to the D.C. busbar on which no rectifier devices are mounted. The upper electrode of each of the rectifier devices in the group of twelve is connected to a fuse, the other side of which is connected to one of the A.C. busbars; four such connections are made to each of the three A.C. busbars. The fuses are mounted on the opposite side of the panel from the busbars, and connections from the fuses 26 to the devices 1 are made by flexible leads 27 connected to pillars 28 passing through the panel. When the protection afforded by individual fuses is not required, the upper electrodes of two or more of the rectifier devices in a group may be connected to the same fuse, or, if no fuses are required, connections may be made directly between the upper electrode of each rectifier device and the appropriate busbar.

The coolant connections 10 and 11 on the rectifier devices mounted on the busbar 22 are connected together directly and the end connections are connected with a coolant supply by pipes 29 of insulating material, so that a single passage for coolant passes through the base electrodes of these devices. Similarly, a single coolant passage passes through the base electrodes of the rectifier devices mounted on the A.C. busbars, but in this case only the inlet and outlet connections of devices mounted on a common busbar may be connected together directly, pipes 30 of insulating material being provided between the coolant connections of devices on adjacent busbars.

It will be seen that the panel, the busbars and the coolant pipes constitute a unitary structure forming a support upon which the rectifiers may be mounted, and in order to remove a rectifier device from the assembly it is necessary only to disconnect its upper electrode from the rest of the circuit and uncouple it from the terminal upon which it is mounted.

Referring now to FIGURE 2, which illustrates a detail of a modified rectifier assembly similar to that described above but in which the rectifier devices are mounted on both sides of the busbars, four rectifier devices 1 arranged to be connected in parallel are mounted two on either side of a common busbar 2. The devices are mounted directly upon the busbars by means constituting electrical terminals providing electrical connections to the base electrodes of the devices, each terminal comprising a brass base 3 bolted to the busbar 2, a brass or copper tube 4 having a flange 5 and a screwed ring 6. The tube 4 engages upon a circular boss on the base member 3 to which it is brazed. The base electrode 7 of each rectifier device is hollow and is closed at one end, a germanium rectifying element 15 being secured to the outer surface of this closed end. The other end of the electrode 7 has a circular rim 8 which bears upon the flange 5 to which it is clamped by means of the screwed ring 6. A sealing ring 9 is housed in an annular recess in the rim 8 of the base electrode. The tube 4 is provided with radial coolant connections 10 and 11 disposed diametrically opposite to each other. The coolant connection 11 is screw-threaded on its outer surface, and communicates with a tube 12 extending axially along the tube 4 and projecting up into the hollow electrode 7. The upper end of the tube 12 is open and spaced from the inner surface of the closed end of the electrode 7. In operation, cooling liquid enters the inner tube 12 via the connection 11, is directed towards the inner surface of the electrode 7, and returns via the annular passage between the tubes 4 and 12 to the connection 10. The connection 10 is formed towards its end with an annular ridge 13, and carries a screwed ring 14 which is adapted to engage with the ridge for the purpose of coupling together adjacent connections 10 and 11, the two connections being adapted to form a cone and taper joint.

It will be seen that the angular position of each rectifier device can be adjusted before the screwed ring 6 is tightened, and the device may therefore be clamped in any desired position.

Instead of having the screwed ring 6 for clamping the rectifier device to the tube 4, the base electrode 7 and the tube 4 may be formed with cooperating screwthreads and adapted to engage one within the other.

I claim:

1. An arrangement comprising a semiconductor having a base electrode constituted by a block of high thermal and electrical conductivity secured in conductive relationship to the semiconductor element of the device, a first tubular member providing an electrical connection to said base electrode and forming therewith a fluid-tight chamber, a second tubular member within said first tubular member and having an open end spaced from the base electrode, releasable clamping means for clamping said base electrode and said first tubular member into engagement, and coolant connections, communicating with said first and second tubular members respectively for circulating coolant through said chamber for cooling the semiconductor element.

2. An arrangement comprising a plurality of semiconductor devices each having a base electrode constituted by a block of high thermal and electrical conductivity secured in conductive relationship to the semiconductor element of the device, a support for said devices, busbars mounted on said support, electrical terminals mounted on said busbars, each terminal engaging the base electrode of a semiconductor device and forming therewith a fluid-tight chamber, releasable clamping means for clamping the base electrodes and said terminals into engagement and coolant connections on said terminals for supplying coolant to said chambers for cooling the semiconductor elements.

3. An arrangement as set forth in claim 2 wherein the coolant connections of a plurality of said terminals mounted on a common busbar are connected in series.

References Cited in the file of this patent

UNITED STATES PATENTS

| | | |
|---|---|---|
| 2,780,759 | Boyer et al. | Feb. 5, 1957 |
| 2,783,418 | Peter et al. | Feb. 26, 1957 |
| 2,806,187 | Boyer et al. | Sept. 10, 1957 |
| 2,815,473 | Ketteringham et al. | Dec. 3, 1957 |
| 2,933,662 | Boyer et al. | Apr. 19, 1960 |
| 2,933,663 | Connell | Apr. 19, 1960 |